Oct. 25, 1949.　　G. C. ARMSTRONG ET AL　　2,486,240
ELECTRIC CIRCUIT FOR RETENTIVE TYPE RELAYS
Filed Aug. 18, 1945
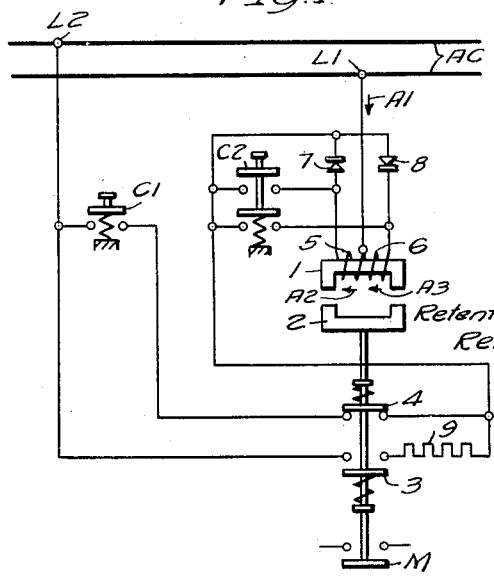
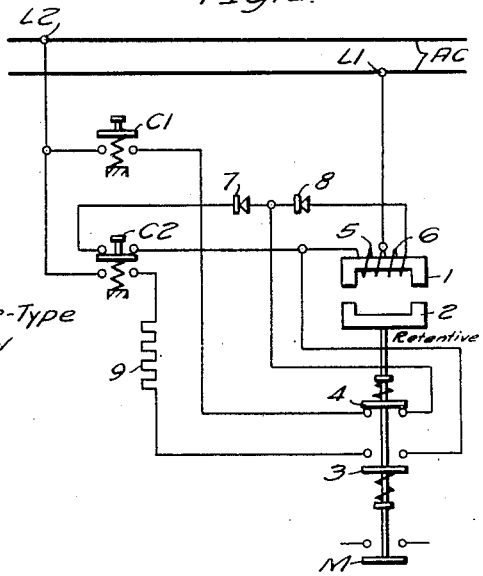
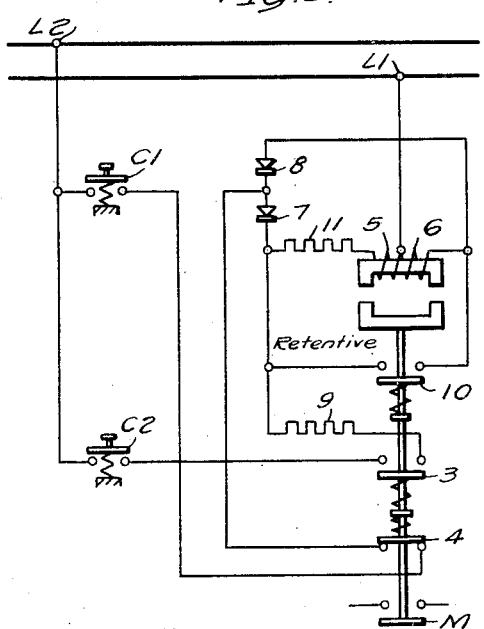
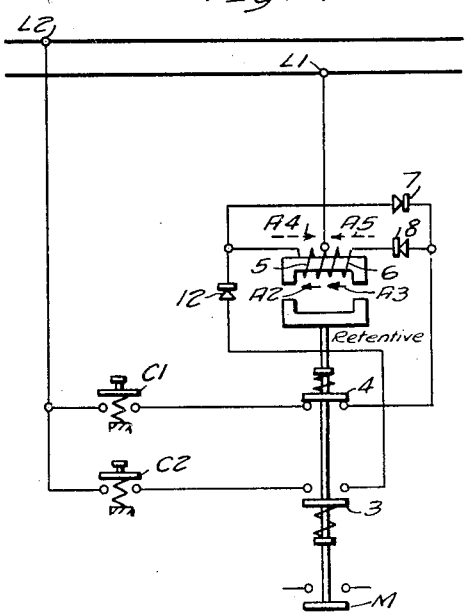
WITNESSES:
INVENTORS
George C. Armstrong
and Owen L. Taylor.
BY
Paul E. Friedemann
ATTORNEY Patented Oct. 25, 1949

2,486,240

UNITED STATES PATENT OFFICE 2,486,240

ELECTRIC CIRCUIT FOR RETENTIVE TYPE RELAYS

George C. Armstrong, Forest Hills, and Owen L. Taylor, Wilkinsburg, Pa., assignors to Westinghouse Electric Corporation, East Pittsburgh, Pa., a corporation of Pennsylvania Application August 18, 1945, Serial No. 611,412

9 Claims. (Cl. 175—320)

Our invention relates to electromagnetic contactors and the like relay type control apparatus for energization from alternating-current lines.

Among the objects of the invention is the provision of alternating-current relays which are distinguished by a greatly reduced or eliminated tendency to flutter when picking up and afford a substantially noiseless performance during the periods of energized and pick-up condition.

In one of its aspects, the invention relates especially to electromagnetic devices of the retentive type, i. e., to relays whose magnetic circuit contains retentive material so that the relay armature stays sealed against the relay field piece due to remanent or residual magnetism once the circuit has been sufficiently magnetized to move the armature into picked-up position. Referring to this type of devices, it is an object of the invention to devise apparatus which secures an ample reliable sealing-in force while requiring no flutter contact and whose operation is not predicated upon an interruption of the energizing current at a given time point or within a given interval of the alternating voltage cycle, and which achieves such a performance by comparatively simple electric circuit means and with the aid of relay contacts of simple design that require no critical timing adjustment.

According to one feature of our invention, we provide the magnetic field structure of a relay with two coil sections which are connected with two rectifier units so as to form a loop circuit with respect to which the two rectifier units have the same polarity. We connect one of the terminal leads of the relay arrangement with the loop circuit at a point between the two coil sections, while the other terminal lead is attached to the circuit at a point between the two rectifier units. When alternating current is supplied to the loop circuit, the two rectifier units act alternately to translate the alternating current into rectifier currents so that the two coil sections are alternately energized, both magnetizing the field structure in the same direction so that their effects are cumulative. As a result, the performance of the coil and rectifier circuit is equivalent to full-wave rectification with respect to the magnetization induced in the field structure. The loop circuit has further the effect that, upon interruption of the energizing alternating current, a unidirectional current, due to the energy stored in the coil sections, is temporarily maintained. The relay is further equipped with controllable demagnetizing means which may be designed in various ways, as will be pointed out hereinafter.

According to another feature of our invention, we provide an alternating-current relay of the retentive type with rectifying means so that the coil, or coils, of the field structure are energized by rectified current when controlled to pick up the relay armature. We equip the relay with an auxiliary contact in connection with a current-limiting resistor or the like impedance so that the auxiliary contact places the resistor in operative condition when the armature is picked up by the field structure. The connection of the resistor is preferably such that it lies in the coil and rectifier circuit so that a flow of reduced current is maintained through the resistor and the coil after the armature has reached its closed position. The relay is further provided with control means, such as a contact, for passing demagnetizing current through the coil, and this control means is connected with the current-limiting resistor so that the demagnetizing current flows also through the resistor.

The above-mentioned and other objects and features of the invention will be apparent from the following description of the embodiments illustrated in the drawing, in which Figures 1 through 4 represent the circuit diagrams of four different control apparatus, respectively.

Referring to Figure 1, numerals 1 and 2 denote the field structure and armature, respectively, of an electromagnetic relay. The armature is biased toward the illustrated open or dropped-off position and is attracted toward the stationary field structure 1 in opposition to the armature bias when the field structure is sufficiently magnetized. The magnetic circuit formed by the structure 1 and the armature 2 is of the retentive type. That is, it contains a material of relatively high remanence as compared with the magnetically soft materials of customary non-retentive relays. For instance, the field structure 1, or the armature 2, or both, may contain laminations of permanent magnet material such as spring steel. Due to the remanence of the retentive circuit, the armature 2, once it is picked up by the field structure, remains sealed against the field structure until the magnetic circuit is demagnetized by the actuation of the dropout control means to be described hereinafter.

The relay armature 2 serves to actuate the main or load contacts of the relay which in the drawing are schematically represented at M. The armature controls further a normally open auxiliary contact 3 and a normally closed auxiliary contact 4.

The energizing coils of the field structure 1 comprise two coil sections 5 and 6. These sections are connected with two rectifier units 7 and 8, for instance of the dry or junction type, so that the elements 5, 6, 7 and 8 form a closed series connection (loop circuit) in which the rectifying units 7 and 8 have the same polarity. The relay terminal L1 is attached to the loop circuit at a point between the coil sections 5 and 6. The second relay terminal L2 is conencted through a normally open control contact, here shown as a push-button type switch C1, with the normally closed relay contact 4 which in turn is attached to loop circuit at a point between the rectifier units 7 and 8. Another normally open control contact C2, also shown as a push-button contact, is connected across the rectifier units 7 and 8 so that both units are short-circuited when the contact C2 is closed. A current-limiting resistor 9 is connected between the contacts 3 and 4, and in series with the contact element of control contact C2.

When the terminals L1 and L2 are connected to an alternating-current line, as shown at AC, the actuation of contact C1 causes the alternating current to energize the coil sections 5 and 6. This current is rectified by the units 7 and 8 so that the coil sections are energized alternately in successive half-cycles of the current. Assuming, for instance, that at the closing moment of contact C1 the instantaneous current has the direction indicated by the arrow A1, this current flows only through the coil section 5 and magnetizes the field structure 1 in the direction denoted by the arrow A2. The rectifier unit 8 prevents this current from flowing through coil 6. During the next half-cycle, the direction of the alternating current is reversed so that now the rectifier unit 7 blocks the flow of current through coil section 6, while coil section 6 is energized and induces a magnetization in the direction indicated by the arrow A3. Since the magnetizing directions A2 and A3 are identical, the alternating effect of the two coil sections is cumulative so that the resultant magnetization of the relay field structure is equivalent to a full-wave rectification of the alternating current despite the fact that only two rectifying units are required to achieve this result. The relay therefore behaves as if it were energized by continuous direct current, and its magnetic circuit develops a strong pick-up force without tendency to flutter. After the armature has reached the closed position, the air gap of the magnetic circuit is reduced or eliminated so that then a much lower holding force suffices to maintain the relay in sealed-in condition. Shortly before the armature abuts against the pole surfaces of the field structure, the contact 4 is opened and the contact 3 closed. As a result, the control contact C1 becomes ineffective and has no further influence on the relay operation while a continuous flow of current is maintained through the resistor 9. This reduced current maintains a slight magnetizing effect on the magnetic relay circuit, and hence prevents the relay from dropping off due to vibration or demagnetizing influences, even during long-lasting periods of closed armature condition.

It will be understood from the foregoing that the rectifying units 7 and 8 carry a high pick-up current only during the short interval between the closing moment of contact C1 and the opening moment of contact 4. This permits rating the rectifier units merely for temporary load. Hence, the dimensions of these two units may be very small so that the unit can easily be accommodated on the relay structure, for instance, on the base plate or in the casing (not illustrated) of the relay.

Due to the fact that the two coil sections and the rectifier units form a closed loop circuit, the flow of current in this circuit does not cease immediately after the opening of contact 4. That is, the inductive energy stored in the coil sections maintains a temporary flow of current in this circuit and this current energizes both coil sections in the magnetizing directions A2 and A3. This imparts to the apparatus a time-delay feature which contributes also to maintaining a continuous magnetization during the pick-up performance and preventing fluttering tendencies.

The control means for demagnetizing the relay in order to cause its armature to return into the open position may be designed in the customary manner. That is, an additional demagnetizing coil may be arranged on the field structure for excitation by alternating current, or by a direct current having demagnetizing polarity. According to our invention, however, we prefer using the above-mentioned sections of the magnetizing coil also for producing the demagnetizing effect. One of the ways of obtaining this result is represented in Fig. 1 by the illustrated connection of the control contact C2. When this contact is closed, the relay being assumed to be in closed condition, the rectifiers 7 and 8 are short-circuited so that an alternating current is passed through both coil sections 5 and 6. This alternating current is of reduced magnitude due to the fact that it traverses the current limiting resistor 9. Due to the demagnetizing effect of the alternating current, the residual magnetism of the magnetic relay circuit is reduced during one or more current cycles until it becomes too low for overcoming the armature bias. The armature will then drop into the illustrated position. The demagnetizing effect is due to the fact that in commercial apparatus of this kind the two coil sections are always somewhat unbalanced in electric or magnetic respects (unless special measures are taken to obtain accurate matching). Hence, the alternating current, flowing in opposing direction, through both coil sections, produces a slight differential field of a suffcent finite magnitude to demagnetize the magnet system. Preferably, however, the coil sections 5 and 6 are given different numbers of turns so that the differential effect of the demagnetizing alternating current has the magnitude best suited in view of the desired voltage range of the dropping-off performance.

The control apparatus according to Fig. 2 is provided with a retentive relay whose field piece 1, armature 2, contacts M, 3, 4 and coils 5, 6 are designed substantially in the same manner as the corresponding elements of the above-described relay shown in Fig. 1. The relay terminal L1 is connected to a point between the coil sections 5 and 6 and the terminal L2 is connected through a start contact C1 and the relay contact 4 with a point between the two rectifier units 7 and 8 of the coil circuit. The stop control contact C2 has make and break contacts. The break contact is connected in the normally closed coil and rectifier circuit, while the make contact lies between coil section 5 and terminal L2 in series with relay contact 3 and with a current-limiting resistor 9.

When the start button C1 is actuated, an alternating current flows between terminals L1 and L2 through relay contact 4. This current is branched off in the coil and rectifier loop circuit, so that the coil sections 5 and 6 are alternately energized, each by a unidirectional current component and impose a continuous full-wave magnetization on the magnetic circuit of the relay, as described above in conjunction with Fig. 1. As soon as the relay armature 2 picks up, i. e. shortly before it seals against the pole faces of the field structure, the contact 4 is opened and the energizing alternating current interrupted. Due to the fact that the magnetization is unidirectional and continuous, and also by virtue of the inductive discharge current temporarily sustained in the coil and rectifier circuit, the magnetization is always amply sufficient to secure a safe picking up and a permanent sealing of the armature due to retentive magnetism. In other words, the sealing-in performance is not dependent on the requirement that the alternating current be interrupted at contact 4 at a given time point or within a limited range of the alternating current cycle. Hence, the contact 4 requires no special mechanical design to insure a proper timing, and the adjustment of its opening moment relative to the period of armature movement is not critical as compared with known alternating-current relays of the retentive type. After the armature is picked up and sealed-in, the contact 3 prepares the circuit of the stop contact C2 by connecting the resistor 9 with coil section 5. When, thereafter, the stop contact C2 is actuated, the closed circuit connection between the coil sections and the rectifiers is opened, and an alternating current is passed from terminal L2 through contact C2, resistor 9, contact 3 and coil section 5 to terminal L1. Coil section 5 is now energized by an alternating current whose magnitude is so rated, by means of resistor 9, as to produce the desired demagnetizing effect, thereby causing the armature to drop out.

Referring to the embodiment illustrated in Fig. 3, the elements 1 through 9 shown in this figure are structurally and functionally similar to the corresponding elements in the preceding embodiments. The movable armature assembly, however, is equipped with an additional contact 10 which is open when the armature is in the illustrated open position. A resistor 11 is disposed in the coil and rectifier circuit in series with the coil section 5. The coil section 5 has a larger number of turns than the section 6. For instance, section 5 may have two-thirds and section 6 one-third of the full number of terms. When the start contact C1 is closed, the alternating current flowing between terminals L1 and L2 is branched into two rectified currents which flow alternately through coils 5 and 6, respectively. Due to the difference in impedance of the two parallel paths formed by the closed coil and rectifier circuit, the coil sections produce a magnetic inductance of respectively different magnitudes; but, since these magnetizations are of the same direction, the resultant effect is again equivalent to a full-wave rectification, that is, the armature, once picked up, will stay sealed in due to the remanence of the retentive magnetic relay circuit. When the armature is in closed position, the actuation of stop contact C2 passes alternating current from terminal L2 through contact 3, resistors 9 and 11, and coil section 5 to terminal L1 and also through contact 10 and coil section 6 to terminal L1. The two coil sections are now energized in opposition to each other, and the two portions of the loop circuit that contain the respective coil sections are unbalanced. Consequently, a differential alternating magnetization results which causes demagnetization of the magnet system. The resistors 9 and 11 are rated in accordance with the desired demagnetizing effect.

The control apparatus shown in Fig. 4 is provided with a relay and an associated control circuit whose elements 1 through 8, M, C1 and C2 are similar to the corresponding elements in the preceding embodiments. When the start contact C1 is closed, a current flows between terminals L1 and L2 and energizes alternately the coil sections 5 and 6, as described in conjunction with Fig. 1. The successive magnetizing effects of these coils have the same direction, as is indicated by the arrows A2 and A3. Hence, the pick-up performance of the relay is the same as that of the embodiments described previously. The stop contact C2 is connected in a circuit which contains a rectifying means 12 under control by the normally open relay contact 3. This additional rectifier circuit is attached to the loop circuit of coil sections 5 and 6 and rectifiers 7 and 8 at a point between one of the rectifiers and the adjacent coil section. The polarity of rectifier 12 is so chosen that it permits a unidirectional flow of current through the series of rectifiers 12, 7 and 8. Assuming the armature to be in closed position, with contact 4 open and contact 3 closed, the actuation of stop contact C2 has the effect of passing a rectified current through contact 3, rectifier 12, and the closed coil circuit to terminal L1. During the half-cycle in which this intermittent current is effective, a part of the current flows from rectifier 12 directly through coil section 5 toward terminal L1. The energization of coil section 5 thus caused has the direction indicated by the arrow A4, i. e. the magnetization is in opposition to that effective during the pick-up performance. Another part of the rectified current flows from rectifier 12 through rectifiers 7 and 8 and traverses the coil section 6. This current magnetizes the field structure 1 in the direction denoted by the arrow A5, which is identical with the magnetizing direction A3 effective during the pick-up performance. The series connection of rectifiers 7 and 8 has a higher impedance than the direct connection of coil 5 to rectifier 12. Consequently, the current now flowing through coil 6 is smaller than the current in coil 5. Consequently, the resultant differential effect of the magnetizations represented by the arrows A4 and A5 is in the direction of the arrow A4 and is relatively small as compared with the cumlative pick-up magnetization represented by arrows A2 and A3. As a result, the rectifier current switched in by the closing of contact C2 acts to reduce the residual magnetism of the relay and causes the armature assembly to drop out. The resultant differential magnitude of the demagnetizing direct current can be adjusted to any desired value by giving the coil sections 5 and 6 correspondingly different numbers of turns of different resistance, or by inserting additional resistance asymmetrically into the coil circuit, for instance, in the manner shown in Fig. 3. The rectifier 12 is effective only during the interval between the closing of contact C2 and subsequent opening of contact 3. Consequently, it may also be rated for intermittent operation so that its dimensions are small. It should be understood, however, that it is also possible to avoid the armature controlled contacts in this as well as in the preceding embodiments, provided the rectifiers are then rated for continuous loading.

It will be apparent from the illustrated embodiments that the control circuits of apparatus can be modified in various respects, without departure from the essential features of the invention. It will also be understood by those skilled in the art tat the mechanical design of the appertaining magnetic relay may be given various designs for securing the desired performance and advantages of the invention.

We claim as our invention:

1. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, said contactor having a normally closed first contact and a normally open second contact, both contacts being connected with said armature to be controlled thereby, two series-connected coil sections inductively associated with said field structure and wound for cumulatively magnetizing said system, said two coil sections having an intermediate circuit point in common, two rectifier units series-connected with each other and with said coil sections to form a loop circuit and having the same rectifying polarity relative to said loop circuit, said two rectifier units having another intermediate circuit point in common, two alternating - current terminals attached across said loop circuit at said two points respectively, a normally open control contact, said control contact and said normally closed contact being series arranged with said loop circuit between said terminals, and a demagnetizing circuit extending between said terminals in series with at least one of said coil sections and including a normally open stop contact and a current limiting circuit member.

2. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, said contactor having a normally closed first contact and a normally open second contact, both contacts being connected with said armature to be controlled thereby, two series connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact disposed in series with said first contact and in series with said loop circuit between said terminals so that, when said start contact is closed, said coil sections are alternately energized through said respective rectifier units, and a demagnetizing circuit extending between said terminals and including in series a normally open stop contact and said second contact, said demagnetizing circuit including also at least one of said coil sections and having a current controlling circuit member series arranged with said coil section for providing demagnetizing coil excitation when said stop contact is actuated while said second contact is closed.

3. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, two series-connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact interposed between said terminals in series with said loop circuit so that, when said start contact is closed, said coil sections are alternately energized through said respective rectifier units to cumulatively magnetize said systems, and a demagnetizing circuit attached, on the one hand, to a point of said loop circuit between one of said coil sections and the adjacent rectifier unit and, on the other hand, to the one terminal that is connected to said other circuit point intermediate said rectifier units, said demagnetizing circuit including a normally open stop contact so that, when said stop contact is closed, said coil sections are differentially energized to demagnetize said system.

4. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, two series-connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact interposed between said terminals in series with said loop circuit so that, when said start contact is closed, said coil sections are alternately energized through said respective rectifier units to cumulatively magnetize said systems, and a demagnetizing circuit attached, on the one hand, to a point of said loop circuit between one of said coil sections and the adjacent rectifier unit and, on the other hand, to the one terminal that is connected to said other circuit point intermediate said rectifier units, said demagnetizing circuit including a normally open stop contact and a third rectifier unit series-connected with each other, said third rectifier unit being poled so as to permit half-wave current to flow serially through all three units and one of said coil sections when said stop contact is closed.

5. Electric control apparatus, comprising an electromagnetic contactor having a retentive magnetic system composed of a field structure and a biased armature and capable, when magnetized, of holding the armature against its bias in closed position due to retentive magnetism, two series-connected coil sections inductively associated with said field structure, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a first contact controlled by said armature so as to be open when said armature is in open position, a second contact controlled by said armature so as to be closed when said armature is in open position, pick-up control means series-connected with said second contact and said loop circuit between said terminals for causing, when actuated, said sections to be energized by rectified current, and a demagnetizing circuit extending from one of said terminals to a point of said loop circuit between one coil section and one rectifier unit and including a third rectifier unit and a normally open stop contact in series connection with said first contact for demagnetizing said system when said stop contact is closed.

6. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, two series-connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact interposed between said terminals in series with said loop circuit so that, when said start contact is closed, said coil sections are alternately energized through said respective rectifier units to cumulatively magnetize said systems, and demagnetizing means having a resistor connected, on the one hand, to a point of said loop circuit between one of said coil sections and the adjacent rectifier unit and, on the other hand, to the one terminal that is connected to said circuit point intermediate said rectifier units, said demagnetizing means having control contact means connected with said loop circuit so as to control at least one of said rectifier units to be ineffective when said contact means are actuated in order to permit alternating current to flow serially through said resistor and said one coil section.

7. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, two series-connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact interposed between said terminals in series with said loop circuit so that, when said start contact is closed, said coil sections are alternately energized through said respective rectifier units to cumulatively magnetize said systems, a demagnetizing circuit including impedance means and being connected, on the one hand, to a point of said loop circuit between one of said coil sections and the adjacent rectifier unit and, on the other hand, to the one terminal that is connected to said other circuit point intermediate said rectifier units, and control means having a make contact and a break contact, said make contact being series-disposed in said demagnetizing circuit, and said break contact being series-disposed in said loop circuit at a place outside the loop circuit portion extending between the points of juncture with said demagnetizing circuit and with said one terminal respectively.

8. Electric control apparatus, comprising an electromagnetic contactor having a retentive magnetic system composed of a field structure and a biased armature and capable of holding the armature against its bias in closed position due to retentive magnetism and of releasing the armature for motion under its bias into open position when the system is demagnetized, two series-connected coil sections inductively associated with said field structure and wound for cumulatively magnetizing said system, said two coil sections having an intermediate circuit point in common, two rectifier units unidirectionally series-connected relative to each other and relative to said coil sections so as to form a loop circuit together with said coil sections, said two rectifier units having another intermediate circuit point in common, two terminals disposed for connection to an alternating-current source and connected across said loop circuit at said two points respectively, a normally open start contact interposed between said terminals in series with said loop circuit so that, when said start contact is closed, said coil sections are alternately energized through said respective rectifier units to cumulatively magnetize said systems, two series-arranged portions of said loop circuit extending from said circuit point intermediate said coil sections to said respective rectifier units being differently rated so that the magnetization produced by one coil section is smaller than that produced by the other, said contactor having a normally open control contact controlled by said armature and connected across said series arranged portions of said loop circuit, and a demagnetizing circuit having a normally open stop contact and being connected, on the one hand, to said control contact and, on the other hand, to the terminal that is connected to said other circuit point intermediate said rectifier units.

9. Electric control apparatus, comprising an electromagnetic contactor having a retentive magnetic system composed of a field structure and a biased armature and capable, when magnetized, of holding the armature against its bias in closed position due to retentive magnetism, two series-connected coil sections inductively associated with said field structure and having a circuit point in common, two rectifier units unidirectionally series-connected relative to each other and relative to said coil sections so as to form a loop circuit together with said coil sections, said two rectifier units having another circuit point in common, two terminals disposed for connection to an alternating-current source and connected to said two points respectively, a first contact controlled by said armature so as to be open when said armature is in open position, a second contact controlled by said armature so as to be closed when said armature is in open position, pick-up control means series-connected with said second contact and said loop circuit between said terminals for causing, when actuated, said sections to be energized by rectified current, and a demagnetizing circuit inductively associated with said system and extending between said terminals, said demagnetizing circuit including a third rectifier unit and a normally closed stop contact in series-connection with said first contact.

GEORGE C. ARMSTRONG.
OWEN L. TAYLOR.

REFERENCES CITED

The following references are of record in the file of this patent:

UNITED STATES PATENTS

| Number | Name | Date |
|---|---|---|
| 1,004,860 | Eastwood | Oct. 3, 1911 |
| 1,029,974 | Burnham | June 18, 1912 |
| 1,038,438 | Rettman | Sept. 10, 1912 |
| 1,142,852 | Simon | June 15, 1915 |
| 1,624,132 | Brown | Apr. 12, 1927 |
| 1,661,651 | Bossart | Mar. 6, 1928 |
| 1,915,566 | Younghusband | June 27, 1933 |
| 2,257,361 | Yorkey | Sept. 30, 1941 |
| 2,260,810 | Jones | Oct. 28, 1941 |
| 2,331,697 | Juchter | Oct. 12, 1943 |
| 2,360,954 | Logan | Oct. 24, 1944 |
| 2,404,982 | Owens | July 30, 1946 |

FOREIGN PATENTS

| Number | Country | Date |
|---|---|---|
| 751,634 | France | Sept. 7, 1933 |